United States Patent [19]
Hetherington

[11] 3,808,683
[45] May 7, 1974

[54] PNEUMATIC PRUNING SHEAR

[76] Inventor: Colin S. Hetherington, 18 Arthur St., Penola, Australia

[22] Filed: June 27, 1972

[21] Appl. No.: 266,535

[30] Foreign Application Priority Data
July 5, 1971 Australia.............................. 5414/71

[52] U.S. Cl. ................................................. 30/228
[51] Int. Cl. ............................................. B26b 15/00
[58] Field of Search ............. 30/216, 228, 241, 242, 30/243, 180; 287/103 A

[56] References Cited
UNITED STATES PATENTS

| 2,543,109 | 2/1951 | Holowka | 30/228 |
| 3,267,573 | 8/1966 | Hill | 30/228 |
| 2,075,341 | 3/1937 | Goodman | 30/228 |
| 1,680,289 | 8/1928 | Graeff | 30/216 |
| 2,056,739 | 10/1936 | Rabezzana | 287/103 A |
| 974,553 | 11/1910 | Cloes | 30/242 |

FOREIGN PATENTS OR APPLICATIONS
766,852   9/1967   Canada................................ 30/228

Primary Examiner—Othell M. Simpson
Assistant Examiner—J. C. Peters
Attorney, Agent, or Firm—Oldham & Oldham Co.

[57] ABSTRACT

The invention relates to a pneumatic pruning shear wherein a rectangular section blade is coupled to the piston rod of a piston and cylinder assembly and is guided for rectilinear movement within a blade guide, the cutting edge of the blade being its forward end and being inclined with respect to the direction of movement, and the blade guide having a recess near its forward end which forms a hook, the cutting edge of the blade traversing the recess portion upon operation of the shear so as to sever any limb contained in the hook recess.

2 Claims, 5 Drawing Figures

PNEUMATIC PRUNING SHEAR

This invention relates to a pneumatically operated pruning shear suitable for the pruning of vines, trees and the like.

Because of the manual effort which is required for the operation of pruning, and consequential fatigue, pneumatically operated pruning shears have been proposed, but the pruning shears which have been proposed heretofore have usually been of a type incorporating a pair of pivoted arms having pruning blades attached thereto, and these are heavy devices which are relatively slow in operation, and tend to become tangled in vines and trees.

The main object of this invention is to provide a light weight easily controlled pruning shear which is nevertheless capable of handling relatively large branches with a minimum of effort.

The invention consists of a pneumatic pruning shear comprising a body, a pneumatic cylinder in the body, a piston slidable within the cylinder, a trigger operated valve in the body, an air passage extending between the valve and the cylinder, so constructed and arranged that operation of the valve introduces air into the cylinder to drive the piston forwardly, a piston rod secured to and extending forwardly of the piston, a blade, a cutting edge across the front end of the blade, means securing the rear end of the blade to the front end of the piston rod, a blade guide carried by and extending forwardly of the body, inner surfaces within the blade guide engaging outer surfaces of the blade guiding the blade for rectilinear movement, and a transverse recess portion in the blade guide near its forward end extending from one side, through one of said inner guide surfaces towards the other said inner guide surface, the sides of said recess being inclined relative to said guide surfaces in a forward direction from the recess opening towards the bottom of said recess, said blade being driven so that the cutting edge moves from a position rearward of the recess portion and traverses the recess portion by forward stroke of the piston in the cylinder, said cutting edge being inclined with respect to direction of movement of said piston to slope in the same direction as the recess edges.

This arrangement then enables an exceedingly compact shear to be constructed, and consequently the shear can be light in weight. Furthermore the use of a hook end greatly reduces accident hazard since it is most unlikely for a finger or other part of the body to become inserted in the hook end. Still further, if the cutting edge is inclined the action of the cylinder gains some mechanical advantage, and the blade cuts with a slicing action.

An embodiment of the invention is described hereunder in some detail with reference to and is illustrated in the accompanying drawings, in which.

Figures 1, 5:
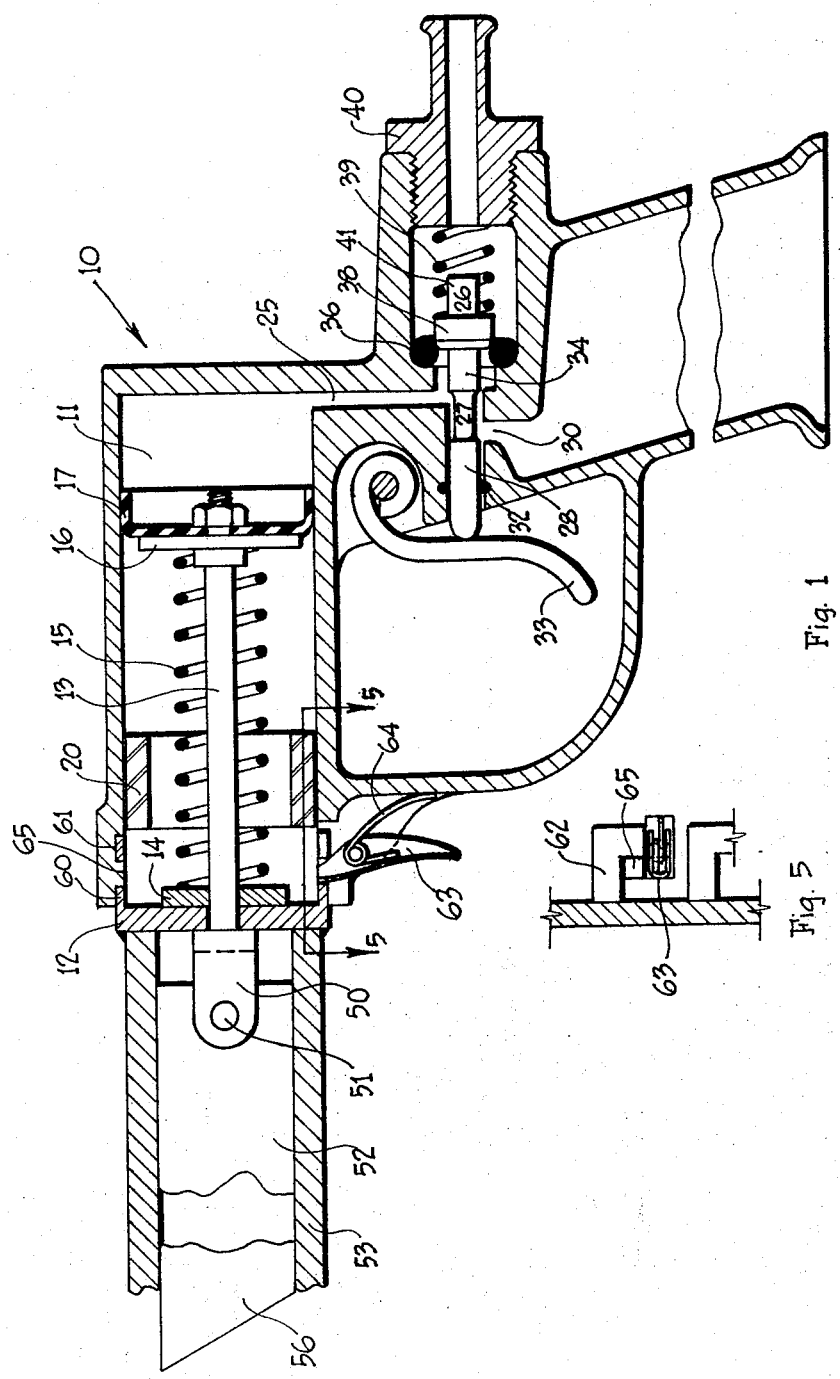
FIG. 1 is a central section through a pruning shear.
FIG. 5 is a section on line 5—5 of FIG. 1, but drawn to an enlarged scale.
Figure 2:
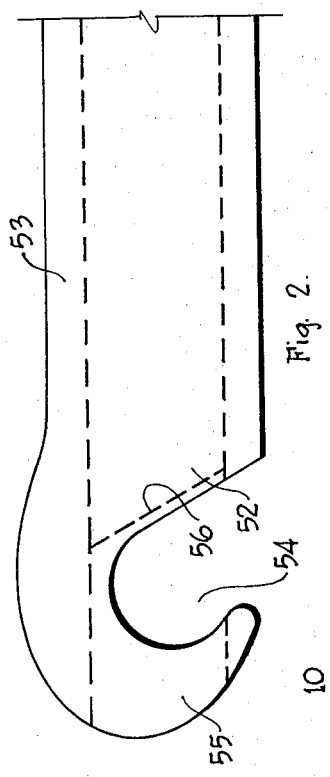
FIG. 2 is a fragmentary elevation of the blade guide.
Figure 3:
FIG. 3 is a plan view of FIG. 2.
Figure 4:
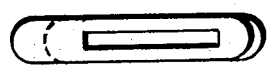
FIG. 4 is an end elevation of FIG. 2.

In this embodiment a pneumatic pruning shear is provided with a body 10 containing a pneumatic cylinder 11 having an end cap 12 at one end, a piston rod 13 which extends through the end cap 12, a washer 14 surrounding the piston rod 13 and functioning as a reaction member for a return spring 15, the return spring 15 also engaging a back-up washer 16 of a bucket type piston 17. A resilient buffer 20 in the form of short length of rubber tubing surrounds the spring 15 and is engageable by the back-up washer 16 of the piston 17 as the piston moves forwardly, this reducing much of the shock which might otherwise be experienced when a cut has been completed and the piston completes its forward stroke.

The rear end of the cylinder is provided with an air passage 25 to a valve 26, the passage being in communication with a space surrounding a necked portion 27 of a plunger 28 when the valve is in its off position, the necked portion 27 of the plunger 28 itself giving an air flow communication to an exhaust port 30 in the valve body, the exhaust port 30 being opposite the communicating passage 25 to the cylinder, but the intersection between the exhaust port and said space being displaced axially forwardly of the intersection between the air passage 25 and said space so that the exhaust port 30 is first closed off when the plunger 28 is moved inwardly, and subsequently air can pass the necked portion 27 into the cylinder 11. The front end of the plunger 28, forwardly of the necked portion 27, slidably and sealably engages a resilient O-ring 32 and is itself engaged by an operating trigger 33, operable to move it rearwardly. Rearwardly of the necked portion 27 there is a short parallel walled portion 34 which is surrounded by an O-ring seat 36, the O-ring seat 36 however, having an inner diameter slightly larger than the diameter of the parallel portion 34 which extends into a valve head 38, the valve head being an annular member surrounding the plunger and having a return spring 39 co-operating between the head 38 and the inlet nozzle 40. The return spring 39 surrounds an extension 41 of the plunger which locates it against displacement in a radial direction. The spring 39 normally urges the valve head 38 against the O-ring seat 36 which functions as a valve head seat, and air pressure assists the spring 39 in this action. Upon depression of the plunger 28 however, the exhaust port 30 is firstly closed off and then air is free to pass the necked portion 27 up into the cylinder 11 rearwardly of the piston 17.

The front end 50 of the piston rod 15 is of forked shape and is coupled by means of a pin 51 to a blade 52, the blade being carried in a flat tubular guide 53 which is secured to the end cap 12. The front end of the flat tubular guide 53 contains a recess portion 54 forming it into a rearward sloping hook end 55, the rear side of the recess being inclined forwards and inward, and the front end 56 of the blade 52 is inclined forwards and inwards substantially parallel to the inclined rear side of the recess and has a cutting edge thereon. The inclined cutting edge 56 is normally rearwardly of the opening 54 of the hook end 55, but upon operation of the air cylinder 11, it is driven forwardly to sever any branch which lies in the opening or recess portion 54 of the hook end 55. The return action of the piston 17 is under the pressure exerted by the return spring 15 in the cylinder 11. The blade 52 does not extend beyond the end of its guide 53 and thereby an accident hazard is avoided. The cutting edge may be any one of a plurality of shapes. To facilitate removal of the blade for sharpening the end cap 12 has a peripheral rim 60 spigoting into an enlarged bore 61 of the cylinder 11, the rim 60 comprising a plurality of bayonet lugs 62 engageable with internal projections 65 in the enlarged bore, the cap 12 being secured by partial rotation of the bayonet lugs in the bore 61 while a trigger 63 is depressed; a spring 64 returning the said trigger to the raised condition whereby it prevents rotation of the cap 12, in turn preventing dislodgement.

A brief consideration of the above embodiment will indicate that the invention is so simple that it enables a pistol grip device of inherently low weight to be utilised. Furthermore the use of the hook end enables the device to be used more quickly than previously proposed pneumatic pruning shears, and with much less accident hazard.

What I claim is:

1. A pneumatic pruning shear comprising a body, a pneumatic cylinder in the body, a piston slidable within the cylinder, a trigger operated valve in the body, an air passage extending between the valve and the cylinder so constructed and arranged that operation of the valve introduces air into the cylinder to drive the piston forwardly, a piston rod secured to and extending forwardly of the piston, a blade, a cutting edge across the front end of the blade, means securing the rear end of the blade to the front end of the piston rod, a blade guide carried by and extending forwardly of the body and engaging outer surfaces of the blade for guiding the blade for rectilinear movement, and a transverse recess portion in the blade guide near its forward end extending thereinto from one side to expose the blade for cutting action, the cutting edge of said blade when driven by the piston moving from a position rearward of the recess portion and traversing the recess portion, an end cap on said blade guide, bayonet cap type lugs on said end cap, and radially inwardly directed projections in said cylinder, the projections being engaged by the lugs.

2. A pneumatic pruning shear according to claim 1 further comprising a spring loaded trigger carried by said body and releasably engaging said end cap to prevent rotation thereof.

* * * * *